US010443635B2

(12) United States Patent
Cuddy

(10) Patent No.: US 10,443,635 B2
(45) Date of Patent: Oct. 15, 2019

(54) PANEL FASTENING SYSTEM

(71) Applicant: The Boeing Company, Chicago, IL (US)

(72) Inventor: Nathanial C. Cuddy, Snohomish, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/296,462

(22) Filed: Oct. 18, 2016

(65) Prior Publication Data
US 2018/0106282 A1    Apr. 19, 2018

(51) Int. Cl.
F16B 5/01     (2006.01)
E04C 2/30     (2006.01)
E04B 2/00     (2006.01)
B64C 3/26     (2006.01)
B64C 1/12     (2006.01)
F16B 11/00    (2006.01)
F16B 37/04    (2006.01)

(52) U.S. Cl.
CPC .............. F16B 5/01 (2013.01); B64C 1/12 (2013.01); B64C 3/26 (2013.01); E04C 2/30 (2013.01); E04C 2/44 (2013.01); F16B 11/006 (2013.01); F16B 37/042 (2013.01)

(58) Field of Classification Search
CPC ........ F16B 5/01; F16B 37/042; F16B 11/006; B64C 1/12; B64C 3/26; E04C 2/44; E04C 2/30
See application file for complete search history.

(56) References Cited

U.S. PATENT DOCUMENTS 3,468,358 A * 9/1969 Neuschotz ............ F16L 35/01
                                                   29/247
4,047,822 A * 9/1977 Lehmann ............ F16B 12/2036
                                                   403/187
4,131,376 A * 12/1978 Busse ................ F16B 12/2036
                                                   312/263

(Continued)

FOREIGN PATENT DOCUMENTS

DE    102007020619 A1    11/2008
FR    2406743 A    5/1979

OTHER PUBLICATIONS

"NMC Ultra Light Honeycomb Panel Fasteners," Product Brochure, Nylon Molding Corporation, Division of NMC Group, Inc., copyright 2016, Esterline Technologies Corporation, 2 pages.

(Continued)

Primary Examiner — Brent W Herring
(74) Attorney, Agent, or Firm — Yee & Associates, P.C.

(57) ABSTRACT

A fastening system for joining a first composite sandwich panel and a second composite sandwich panel comprising a cam assembly and a stud receiving assembly. The cam assembly is configured to be positioned within a first hole extending through a thickness of a first composite sandwich panel. The cam assembly comprises a housing and a cam connector rotatable within the housing. The cam connector is configured to engage a head of a stud. The stud receiving assembly is configured to be positioned within a second hole extending through a thickness of a second composite sandwich panel. The stud receiving assembly has internal retaining channels configured to secure a first end of the stud.

20 Claims, 13 Drawing Sheets

(56) References Cited

U.S. PATENT DOCUMENTS

| | | | | |
|---|---|---|---|---|
| 4,353,663 | A * | 10/1982 | Glickman | F16B 12/20 403/230 |
| 4,599,011 | A * | 7/1986 | Tashiro | F16B 12/2036 403/245 |
| 4,981,735 | A * | 1/1991 | Rickson | F16B 5/01 156/92 |
| 4,990,020 | A * | 2/1991 | Matsui | F16B 12/2036 403/20 |
| 5,093,957 | A | 3/1992 | Do | |
| 5,123,304 | A * | 6/1992 | Carmien | B25G 3/34 403/265 |
| 5,375,923 | A * | 12/1994 | Hall | A47B 88/956 312/330.1 |
| 5,393,185 | A | 2/1995 | Duffy, Jr. | |
| 5,676,487 | A * | 10/1997 | Lautenschlager | F16B 12/2009 403/231 |
| 5,772,353 | A * | 6/1998 | Grieser | F16B 12/2036 403/231 |
| 5,788,395 | A * | 8/1998 | Grieser | F16B 12/2036 403/231 |
| 5,810,505 | A * | 9/1998 | Henriott | F16B 12/14 108/153.1 |
| 5,823,700 | A * | 10/1998 | Poworoznek | F16B 12/2036 403/245 |
| 6,142,700 | A * | 11/2000 | Grieser | F16B 12/2036 403/286 |
| 6,488,460 | B1 * | 12/2002 | Smith | F16B 5/01 411/339 |
| 6,862,863 | B2 | 3/2005 | McCorkle et al. | |
| 6,908,252 | B1 * | 6/2005 | Rubano | F16B 12/2027 403/231 |
| 6,939,075 | B2 * | 9/2005 | Walz | F16B 12/2036 403/231 |
| 7,195,436 | B1 | 3/2007 | Stephen | |
| 7,223,045 | B2 * | 5/2007 | Migli | F16B 12/2009 29/452 |
| 8,297,169 | B2 * | 10/2012 | Kunda | F16B 5/025 411/108 |
| 8,714,863 | B2 * | 5/2014 | Vallance | F16B 12/2036 403/245 |
| 8,794,864 | B2 * | 8/2014 | Vallance | F16B 12/2036 403/350 |
| 9,003,662 | B2 | 4/2015 | Burd et al. | |
| 9,109,615 | B2 | 8/2015 | Cuddy et al. | |
| 9,862,166 | B2 * | 1/2018 | Lopez | B32B 3/12 |
| 9,976,583 | B2 * | 5/2018 | Lopez | B32B 7/08 |
| 10,099,767 | B2 * | 10/2018 | Lewis | B64C 1/12 |
| 10,228,003 | B2 * | 3/2019 | Nipper | B32B 7/08 |
| 2004/0265091 | A1 * | 12/2004 | Cheung | B29C 65/54 411/338 |
| 2010/0115882 | A1 * | 5/2010 | Seroiszka | F16B 13/141 52/787.1 |
| 2010/0202852 | A1 * | 8/2010 | Krause | F16B 12/2027 411/272 |
| 2012/0174765 | A1 * | 7/2012 | Kunda | F16B 5/025 89/36.08 |
| 2013/0014376 | A1 * | 1/2013 | Komsitsky | F16B 5/0208 29/525.02 |
| 2017/0036750 | A1 * | 2/2017 | Lewis | B64C 1/12 |
| 2017/0253006 | A1 * | 9/2017 | Lopez | B32B 3/12 |

OTHER PUBLICATIONS

"We Design and Manufacture Quality Fasteners, Delivering Fitting Solutions for the Most Challenging applications." Shur-Lok Company: SPS Fastener Division, A PCC Company, copyright 2015, 2 pages, accessed Aug. 15, 2016. http://www.shur-lok.eu/.

"New Products, Honeycomb Panel Fasteners, Honeycomb Panel Inserts, Panel Fasteners, Honeycomb inserts," The Young Engineers, Inc., product brochure, copyright 2013, 3 pages, accessed Aug. 15, 2016. http://www.youngengineers.com/NewProducts.aspx.

"Butt Joint," Wikimedia Foundation, Inc., Wikipedia, last modified Jun. 17, 2016, 5 pages, accessed Aug. 31, 2016. https://en.wikipedia.org/wiki/Butt_joint#knock-down_fasteners.

Extended European Search Report, dated Jan. 3, 2018, regarding Application No. 17194603.1, 8 pages.

* cited by examiner

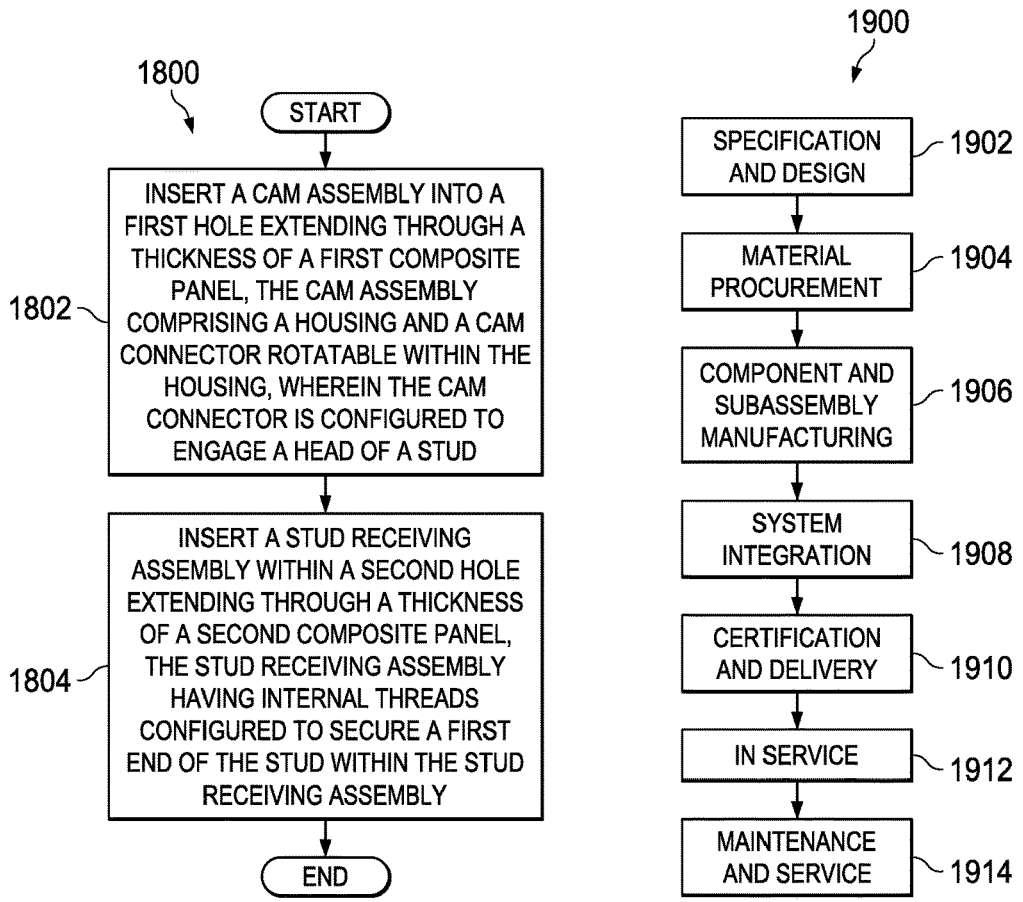
FIG. 18
FIG. 19
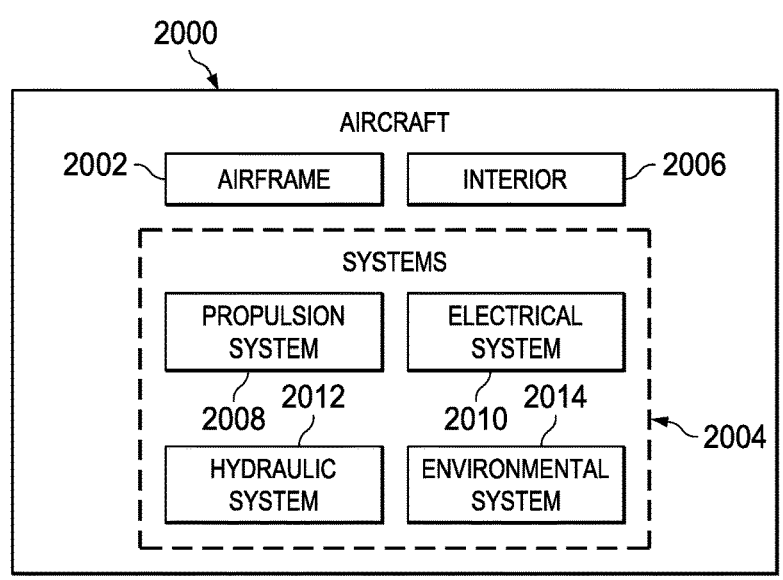
FIG. 20

PANEL FASTENING SYSTEM

BACKGROUND INFORMATION

1. Field

The present disclosure relates generally to joining panels, and more specifically, to joining composite sandwich panels. Yet more specifically, the present disclosure includes a fastening system for joining a first composite sandwich panel and a second composite sandwich panel.

2. Background

A composite panel may be considered a composite sandwich panel when the composite panel is comprised of a core layer of material that is sandwiched between a first layer of material and a second layer of material. The core layer of material may have a greater thickness than the first and second layers of material. In some cases, the core layer of material may be comprised of a honeycomb material, a foam material, or some other structure. A honeycomb material may be a material that has a honeycomb-like structure.

Methods for joining composite sandwich panels are currently undesirably time consuming. Further, joining methods for joining composite sandwich panels generate an undesirable amount of waste. For example, applying potting material to conventional joining hardware produces material, protective gear, and application tool waste. Therefore, it would be desirable to have a method and apparatus that takes into account at least some of the issues discussed above, as well as other possible issues. For example, it would be desirable to have a method and apparatus that reduces the time for joining composite sandwich panels.

SUMMARY

In one illustrative embodiment, a fastening system for joining a first composite sandwich panel and a second composite sandwich panel is provided. The fastening system comprises a cam assembly and a stud receiving assembly. The cam assembly is configured to be positioned within a first hole extending through a thickness of a first composite sandwich panel. The cam assembly comprises a housing and a cam connector rotatable within the housing. The cam connector is configured to engage a head of a stud. The stud receiving assembly is configured to be positioned within a second hole extending through a thickness of a second composite sandwich panel. The stud receiving assembly has internal retaining channels configured to secure a first end of the stud of the stud within the receiving assembly.

In another illustrative embodiment, a panel system for forming a monument is presented. The panel system comprises a first composite sandwich panel, a cam assembly, a second composite sandwich panel, and a stud receiving assembly. The first composite sandwich panel has a first hole extending through a thickness of the first composite sandwich panel. The cam assembly is positioned within the first hole. The cam assembly comprises a housing and a cam connector rotatable within the housing. The cam connector is configured to engage a head of a stud. The second composite sandwich panel has a second hole extending through a thickness of the second composite sandwich panel. The stud receiving assembly is positioned within the second hole. The stud receiving assembly has internal retaining channels configured to secure a first end of the stud within the stud receiving assembly.

In yet another illustrative embodiment, a method is presented. A cam assembly is inserted into a first hole extending through a thickness of a first composite panel, the cam assembly comprising a housing and a cam connector rotatable within the housing, wherein the cam connector is configured to engage a head of a stud. A stud receiving assembly is inserted within a second hole extending through a thickness of a second composite panel, the stud receiving assembly, having internal retaining channels, is configured to secure a first end of the stud within the stud receiving assembly.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 18 is an illustration of a flowchart of a method of joining two composite sandwich panels in accordance with an illustrative embodiment;

FIG. 19 is an illustration of an aircraft manufacturing and service method in the form of a block diagram in accordance with an illustrative embodiment; and FIG. 20 is an illustration of an aircraft in the form of a block diagram in which an illustrative embodiment may be implemented.

DETAILED DESCRIPTION

The different illustrative embodiments recognize and take into account one or more different considerations. For example, the illustrative embodiments recognize and take into account that some known monuments for use in vehicles may be formed from lightweight composite panels having a core. The illustrative embodiments recognize and take into account that the core is not configured to bear in-plane shear loads. Rather, the skins of the composite panels bear shear loading on the panel.

The illustrative embodiments further recognize and take into account that current systems to join composite panels may utilize fastener and bracket designs. In these designs, turning of physical fasteners joins two panels. However, fastener and bracket designs may be heavier than desired and use a larger amount of labor than desired.

The illustrative embodiments further recognize and take into account that fastener and bracket designs use a large number of fasteners, heavy metal brackets, and potted inserts to achieve the loading specifications for aircraft parts. The illustrative embodiments also recognize and take into account that some fasteners may be installed into the incorrect holes. Further, the illustrative embodiments recognize and take into account installing the correct fasteners in the correct holes may be more time-consuming than desired.

The illustrative embodiments recognize and take into account that some fastener-less assembling methods may be used. However, the illustrative embodiments recognize and take into account that these methods may require precision machining and fitting of the panels. Further, the illustrative embodiments recognize and take into account that these fastener-less assembly methods use a potting material that may add an additional undesirable wait time and produce an undesirable amount of waste. For example, the illustrative embodiments recognize and take into account that applying a potting compound which uses a large amount of support materials for installing the potting, cleaning the potting compound, moving the compound and personnel protection.

The illustrative embodiments recognize and take into account that conventional knock-down fasteners may provide a means of quickly joining two components. The illustrative embodiments also recognize and take into account that knock-down fasteners may join two components with little to no waste. However, the illustrative embodiments recognize and take into account that conventional knock-down fasteners cannot be used with composite panels having cores because the core cannot bear the shear load exerted by these conventional fasteners.

Figure 1:
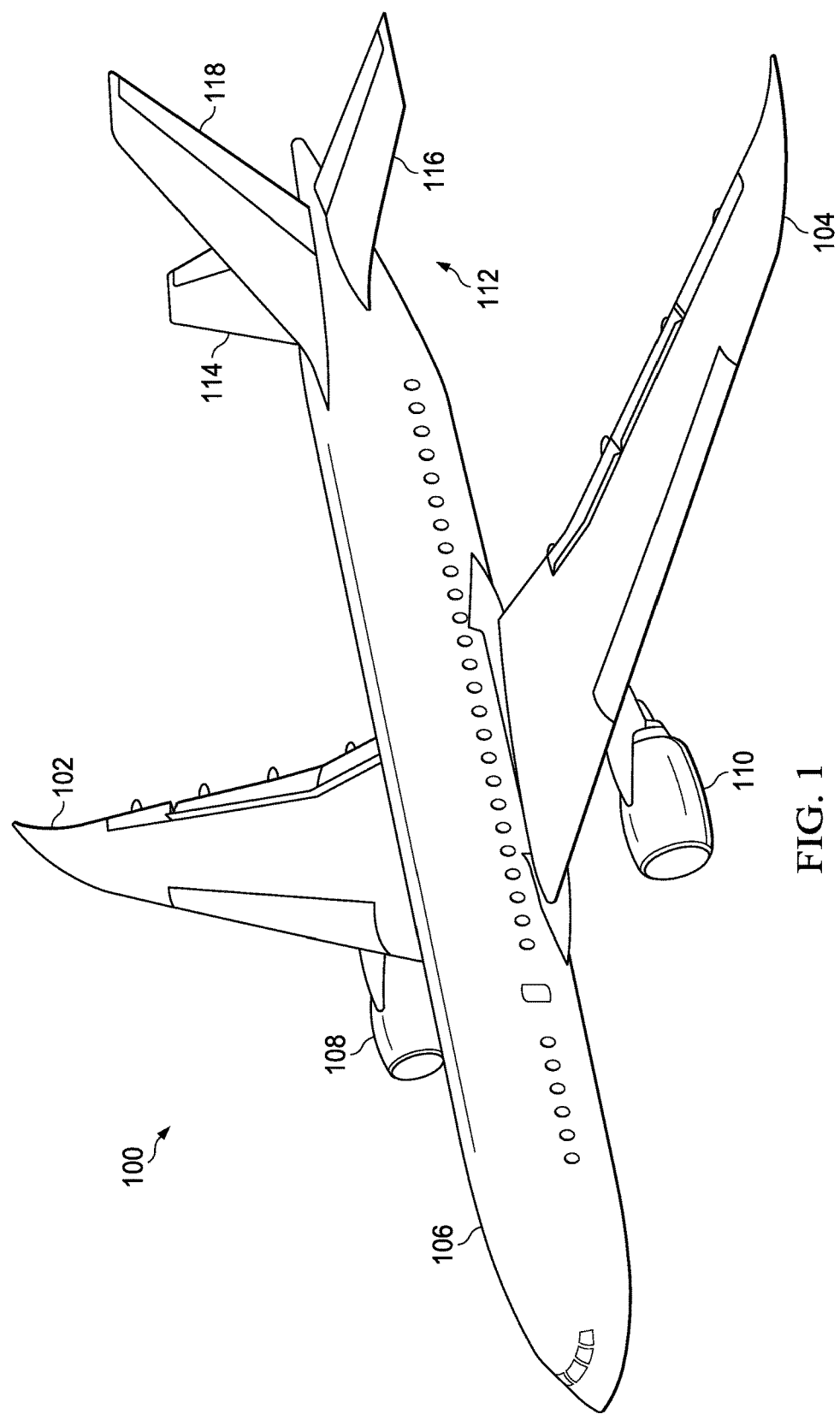
FIG. 1 is an illustration of an aircraft in which an illustrative embodiment may be implemented.

Referring now to the figures and, in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having a panel fastening system. For example, aircraft 100 is an example of an aircraft having a panel fastening system joining composite sandwich panels as described in at least one of wing 102, wing 104, or body 106.

As used herein, the phrase "at least one of," when used with a list of items, means different combinations of one or more of the listed items may be used, and only one of each item in the list may be needed. In other words, "at least one of" means any combination of items or number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combination of these items may be present. In other examples, "at least one of" may be, for example, without limitation, two of item A, one of item B, and ten of item C; four of item B and seven of item C; or other suitable combinations.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft.

Although the illustrative examples for an illustrative embodiment are described with respect to an aircraft, an illustrative embodiment may be applied to other types of monuments. The monument may be, for example, a mobile structure, a stationary structure, a land-based structure, an aquatic-based structure, or a space-based structure. More specifically, the monument may be a surface ship, a tank, a personnel carrier, a train, a spacecraft, a space station, a satellite, a submarine, a manufacturing facility, a building, or other suitable structures. Further the monument may be a portion of any desirable structure.

Figure 2:
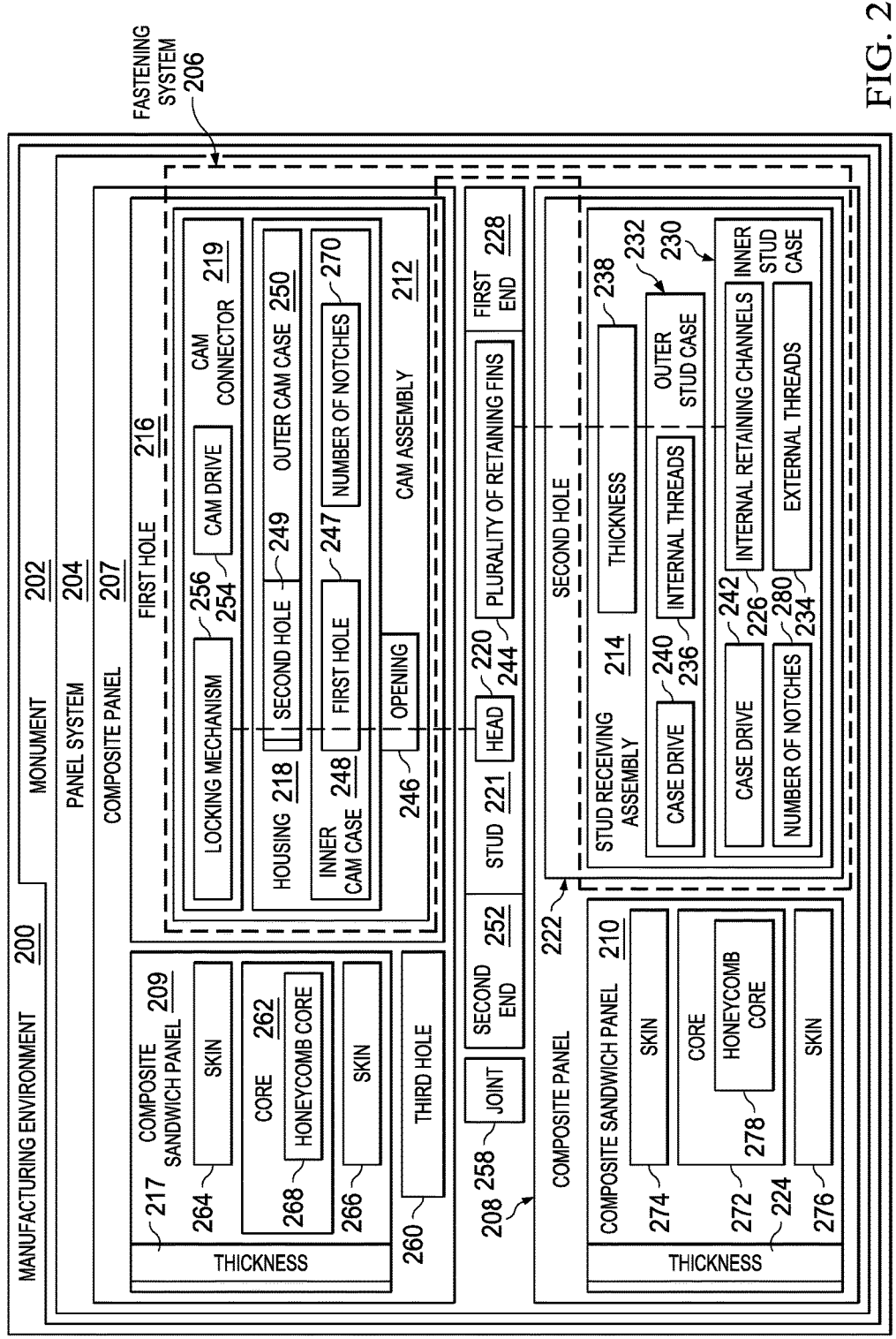
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Portions of aircraft 100 may be manufactured in manufacturing environment 200. For example, monument 202 of manufacturing environment 200 may be a component of one of wing 102, wing 104, or body 106 of aircraft 100.

Panel system 204 is used to form monument 202. Panel system 204 includes fastening system 206 for joining composite panel 207 and composite panel 208. In some illustrative examples, composite panel 207 takes the form of composite sandwich panel 209. In some illustrative examples, composite panel 208 takes the form of composite sandwich panel 210.

In these illustrative examples, fastening system 206 joins composite sandwich panel 209 and composite sandwich panel 210. Fastening system 206 comprises cam assembly 212 and stud receiving assembly 214. Cam assembly 212 is configured to be positioned within first hole 216 extending through thickness 217 of composite sandwich panel 209. In some illustrative examples, composite sandwich panel 209 may be referred to as a first composite sandwich panel.

Cam assembly 212 comprises housing 218 and cam connector 219 which is rotatable within housing 218. Cam connector 219 is configured to engage head 220 of stud 221.

Stud receiving assembly 214 is configured to be positioned within second hole 222 extending through thickness 224 of composite sandwich panel 210. In some illustrative examples, composite sandwich panel 210 may be referred to as a second composite sandwich panel. Stud receiving assembly 214 has internal retaining channels 226 configured to secure first end 228 of stud 221 within stud receiving assembly 214.

Stud receiving assembly 214 includes inner stud case 230 and outer stud case 232. External threads 234 of inner stud case 230 engage internal threads 236 of outer stud case 232. Thickness 238 of stud receiving assembly 214 is adjusted by moving at least one of external threads 234 or internal threads 236 relative to each other. Thickness 238 is adjusted such that thickness 238 is substantially the same as thickness 224. Adjusting thickness 238 compensates for tolerances in thickness 224 of composite sandwich panel 210.

Thickness 238 of stud receiving assembly 214 is adjusted by applying torque to at least one of case drive 240 of outer stud case 232 or case drive 242 of inner stud case 230. Case drive 240 and case drive 242 may be any desirable type of drive. In some illustrative examples, case drive 240 and case drive 242 may be the same type of drive. For example, case drive 240 and case drive 242 may both be hexagonal sockets. In other illustrative examples, case drive 240 and case drive 242 may be different types of drives. For example, case drive 240 may be a drive for a flathead screwdriver while case drive 242 is a socket.

First end 228 of stud 221 is inserted into case drive 242 to secure first end 228 of stud 221 within stud receiving assembly 214. Stud 221 comprises plurality of retaining fins 244 configured to engage internal retaining channels 226 of stud receiving assembly 214.

When first end 228 of stud 221 is inserted into stud receiving assembly 214, plurality of retaining fins 244 elastically bend to enter internal retaining channels 226. Afterwards, the strength of plurality of retaining fins 244 retains first end 228 within inner stud case 230.

Stud 221 may be referred to as a Christmas tree stud. The design and material of stud 221 are selected to yield to be inserted into stud receiving assembly 214. The design and material of stud 221 are selected to carry tension load into shear load.

The material for stud 221 is formed of a material configured to provide one-way plastic deformation. Stud 221 may be formed from a super engineering grade plastic with high yield moduluses and a high deflection temperature. A material for stud 221 desirably deforms but maintains tension. In some illustrative examples, housing 218 and stud receiving assembly 214 are formed of the same material as stud 221. In other illustrative examples, housing 218 and stud receiving assembly 214 may be formed of materials different from stud 221. For example, at least one of stud receiving assembly 214 or housing 218 may be formed of aluminum or another relatively low weight metal, while stud 221 is formed of a high performing thermoplastic such as PEEK.

Housing 218 of cam assembly 212 comprises opening 246 configured to receive head 220 of stud 221. First hole 247 in inner cam case 248 and second hole 249 in outer cam case 250 form opening 246 of housing 218.

Housing 218 comprises inner cam case 248 and outer cam case 250. Inner cam case 248 and outer cam case 250 have a friction fit.

After head 220 on second end 252 of stud 221 is inserted into opening 246, cam connector 219 is rotated using cam drive 254. Cam drive 254 may take the form of any desirable drive. For example, cam drive 254 may be a female or a male drive. As another example, cam drive 254 may be a drive for a screwdriver or a socket. In one illustrative example, cam drive 254 is a drive for a Phillips head screwdriver. Cam drive 254 may be selected based on availability of the drive tool. For example, a cam drive 254 with a common associated drive tool may allow for multiple drive tools to be available. Further, if the drive tool is common, the drive tool may be less expensive than specialty drive tools.

Cam connector 219 may be rotated any desirable amount. In some illustrative examples, cam connector 219 is rotated a quarter turn using cam drive 254. Rotating cam connector 219 retains head 220 of stud 221 within cam assembly 212. More specifically, rotating cam connector 219 places locking mechanism 256 of cam connector 219 in contact with head 220 of stud 221. Locking mechanism 256 discourages rotation of cam connector 219 due to friction with head 220. Further, locking mechanism 256 prevents head 220 from exiting opening 246 of housing 218. Rotating cam connector 219 using cam drive 254 compression locks onto head 220 of stud 221 to couple composite panel 207 and composite panel 208 together.

By rotating cam connector 219, composite sandwich panel 209 and composite sandwich panel 210 are connected to form joint 258. In some illustrative examples, joint 258 takes the form of a butt joint. In this illustrative example, stud 221 extends out of composite sandwich panel 210 perpendicular to first hole 216 of composite panel 207. In these illustrative examples, stud 221 may extend through third hole 260 of composite panel 207. Third hole 260 is perpendicular to first hole 216. When first hole 216 is positioned at an edge of composite panel 207, third hole 260 is not present.

When composite panel 207 takes the form of composite sandwich panel 209, composite sandwich panel 209 comprises core 262 between skin 264 and skin 266. Core 262 may be honeycomb core 268. When composite panel 207 includes honeycomb core 268, first hole 216 may open into air pockets within honeycomb core 268. An adhesive material, such as a potting material, may be injected into these air pockets. Adhesive material may be injected into the air pockets through number of notches 270 of inner cam case 248.

When composite panel 208 takes the form of composite sandwich panel 210, composite sandwich panel 210 comprises core 272 between skin 274 and skin 276. Core 272 may be honeycomb core 278. When composite panel 210 includes honeycomb core 278, second hole 222 may open into air pockets within honeycomb core 278. An adhesive material, such as a potting material, may be injected into these air pockets. Adhesive material may be injected into the air pockets through number of notches 280 of inner stud case 230.

When loads are applied to joint 258, applied shear loads will be transferred to skin 264, skin 266, skin 274, and skin 276 by stud 221. More specifically, when loads are applied to joint 258, skin 264, skin 266, skin 274, and skin 276 carry the majority of the load. Core 262 and core 272 carry little to no load. Any shear or bending loads on composite panel 207 or composite panel 208 will transfer through fastening system 206 to the skins of the other of composite panel 207 or composite panel 208 as shear or bending loads.

The illustrations of manufacturing environment 200 in FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although stud 221 is discussed as being formed of a polymeric material, in some illustrative examples stud 221 may be formed of aluminum or another light weight metal. In these illustrative examples, instead of stud 221 having plurality of retaining fins 244, stud 221 may have internal retaining channels 226, while inner stud case 230 has plurality of retaining fins 244 formed of a thermoplastic material.

As another example, although panel system 204 is described as having composite panel 207 and composite panel 208, panel system 204 may have panels of any desirable material. For example, panel system 204 may include panels of metallic materials, polymeric materials, ceramics, or any combination thereof. Fastening system 206 and stud 221 may be used to join panels of any desirable material.

Further, although monument 202 can be a component of aircraft 100, monument 202 could be any desirable monument 202. In some illustrative examples, monument 202 is in an area other than aerospace applications.

Yet further, portions of fastening system 206 may be formed of any desirable material. Components of fastening system 206 may be formed of the same material or different materials. Components of fastening system 206 may be formed of at least one of a composite, a metal, a ceramic, a polymer, or any other desirable material.

Figure 3:
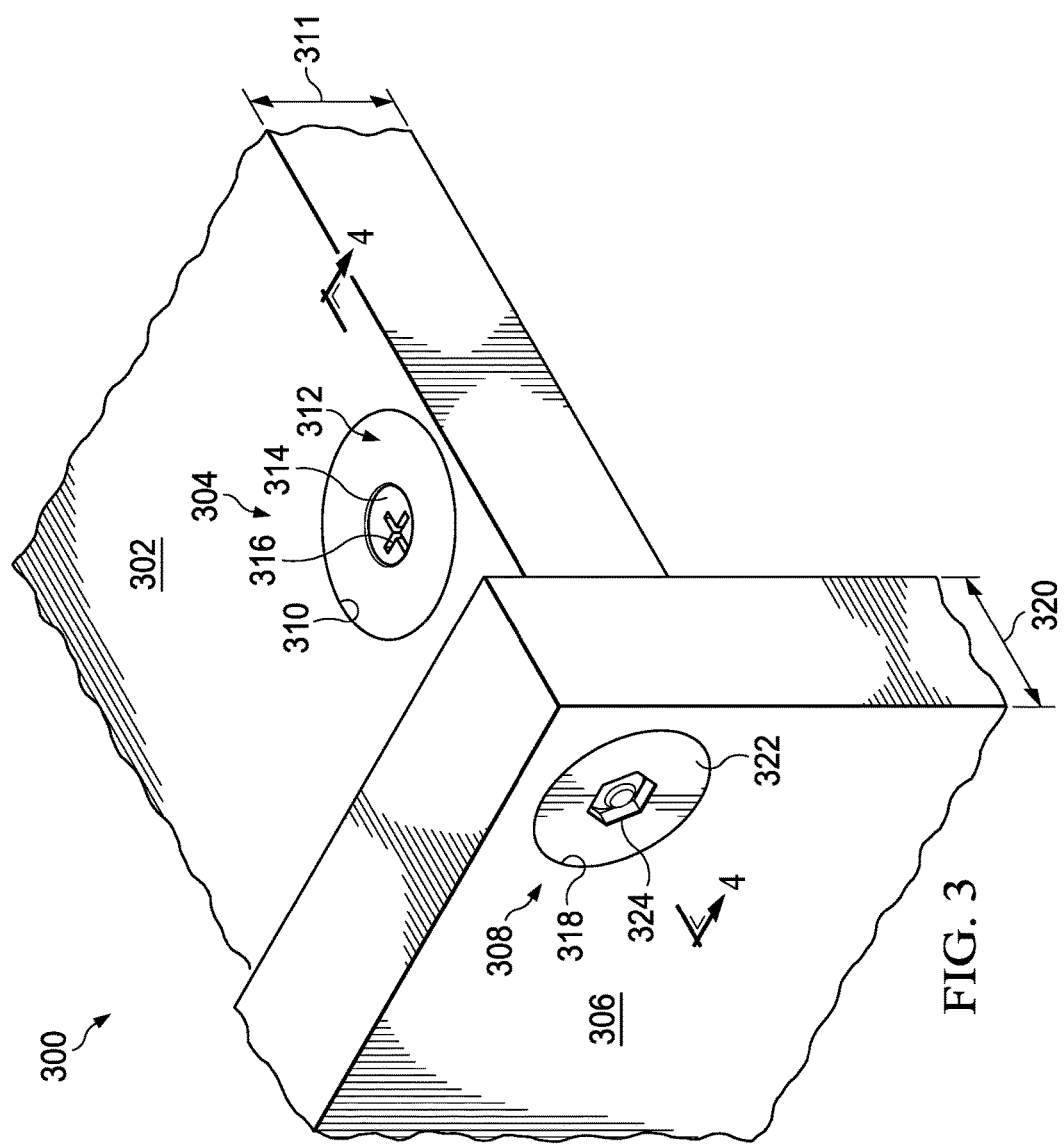
FIG. 3 is an illustration of an isometric view of a panel system in accordance with an illustrative embodiment.

Turning now to FIG. 3, an illustration of an isometric view of a panel system is depicted in accordance with an illustrative embodiment. Panel system 300 is a physical implementation of panel system 204 of FIG. 2.

Panel system 300 includes first composite sandwich panel 302, cam assembly 304, second composite sandwich panel 306, and stud receiving assembly 308. First composite sandwich panel 302 has first hole 310 extending through thickness 311 of first composite sandwich panel 302.

Cam assembly 304 is positioned within first hole 310. Cam assembly 304 comprises housing 312 and cam connector 314 rotatable within housing 312. Cam connector 314 is configured to engage a head of a stud.

Cam connector 314 has cam drive 316. Cam connector 314 is rotated within housing 312 by using a driver that engages cam drive 316. In this illustrative example, cam drive 316 is a drive for a Phillips head screwdriver. However, in other illustrative examples, cam drive 316 may take the form of any desirable drive.

Second composite sandwich panel 306 has second hole 318 extending through thickness 320 of second composite sandwich panel 306. Stud receiving assembly 308 is positioned within second hole 318. Stud receiving assembly 308 comprises inner stud case 322. Inner stud case 322 has case drive 324. A thickness of stud receiving assembly 308 is changed using case drive 324. Case drive 324 may be used to change the thickness of stud receiving assembly 308 to accommodate the tolerance of thickness 320 of second composite sandwich panel 306. As illustrated, case drive 324 is a hex socket drive. However, case drive 324 may take the form of any desirable type of drive.

Figure 4:
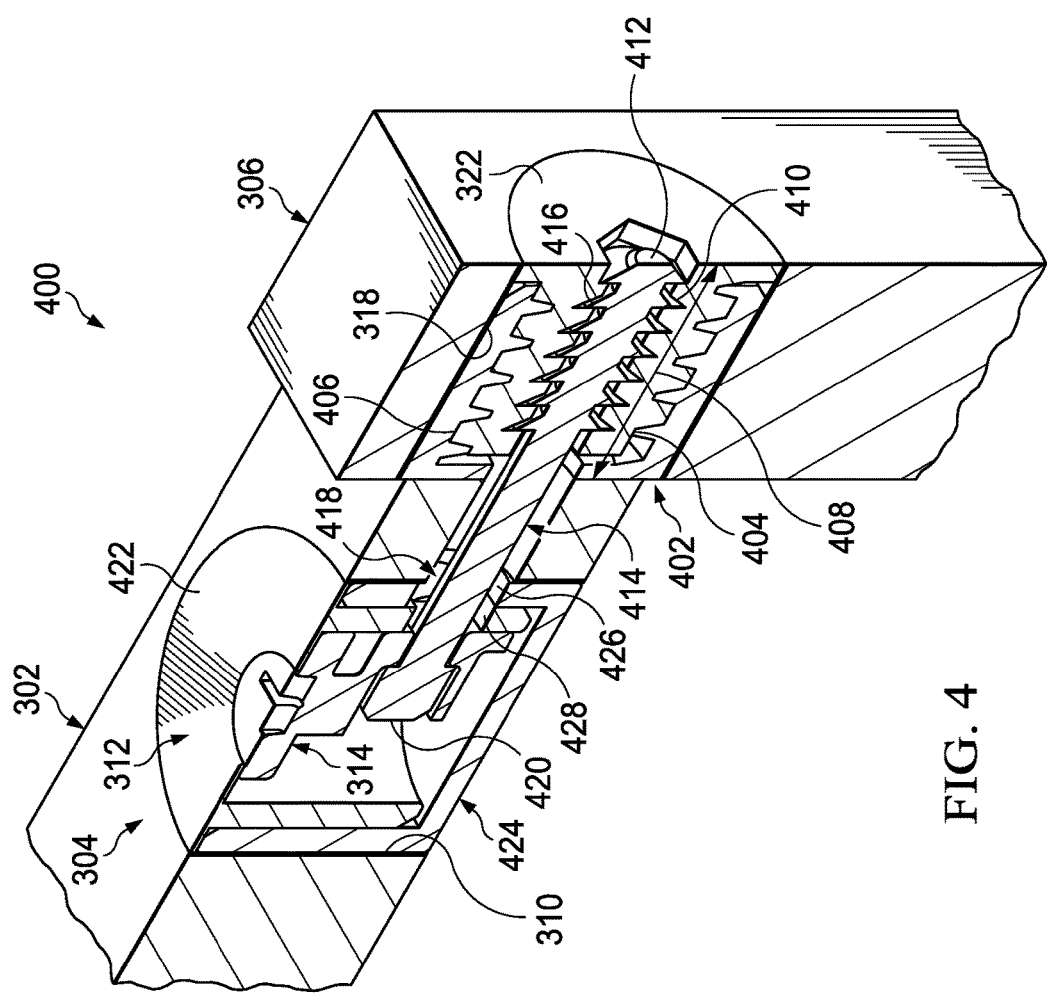
FIG. 4 is an illustration of an isometric cross-sectional view of a panel system in accordance with an illustrative embodiment.

Turning now to FIG. 4, an illustration of an isometric cross-sectional view of a panel system is depicted in accordance with an illustrative embodiment. View 400 is an isometric cross-sectional view of panel system 300 of FIG. 3 from direction 4-4.

As can be seen in view 400, stud receiving assembly 308 in FIG. 3 comprises outer stud case 402 and inner stud case 322. Internal threads 404 of outer stud case 402 engage external threads 406 of inner stud case 322. By rotating inner stud case 322 using case drive 324, thickness 408 of stud receiving assembly 308 is changed. By rotating inner stud case 322 using case drive 324, external threads 406 move relative to internal threads 404.

Stud receiving assembly 308 has internal retaining channels 410 configured to secure first end 412 of stud 414. Stud 414 comprises plurality of retaining fins 416 configured to engage internal retaining channels 410 of stud receiving assembly 308.

Housing 312 has opening 418 configured to receive head 420 of stud 414. Housing 312 comprises inner cam case 422 and outer cam case 424. First hole 426 in inner cam case 422 and second hole 428 in outer cam case 424 form opening 418. As depicted, inner cam case 422 and outer cam case 424 have a friction fit. The friction fit retains inner cam case 422 within outer cam case 424.

Although, as depicted in FIG. 4, first composite sandwich panel 302 and second composite sandwich panel 306 appear to be solid, this is for simplicity of illustration only. In practice, first composite sandwich panel 302 and second composite sandwich panel 306 would each have a core layer of material that is sandwiched between a first layer of material and a second layer of material. Further, in some illustrative examples, instead of first composite sandwich panel 302 and second composite sandwich panel 306, the panels to be joined may be solid panels. Although described as first composite sandwich panel 302 and second composite sandwich panel 306, the panels to be joined may be formed of any desirable material.

Figure 5:
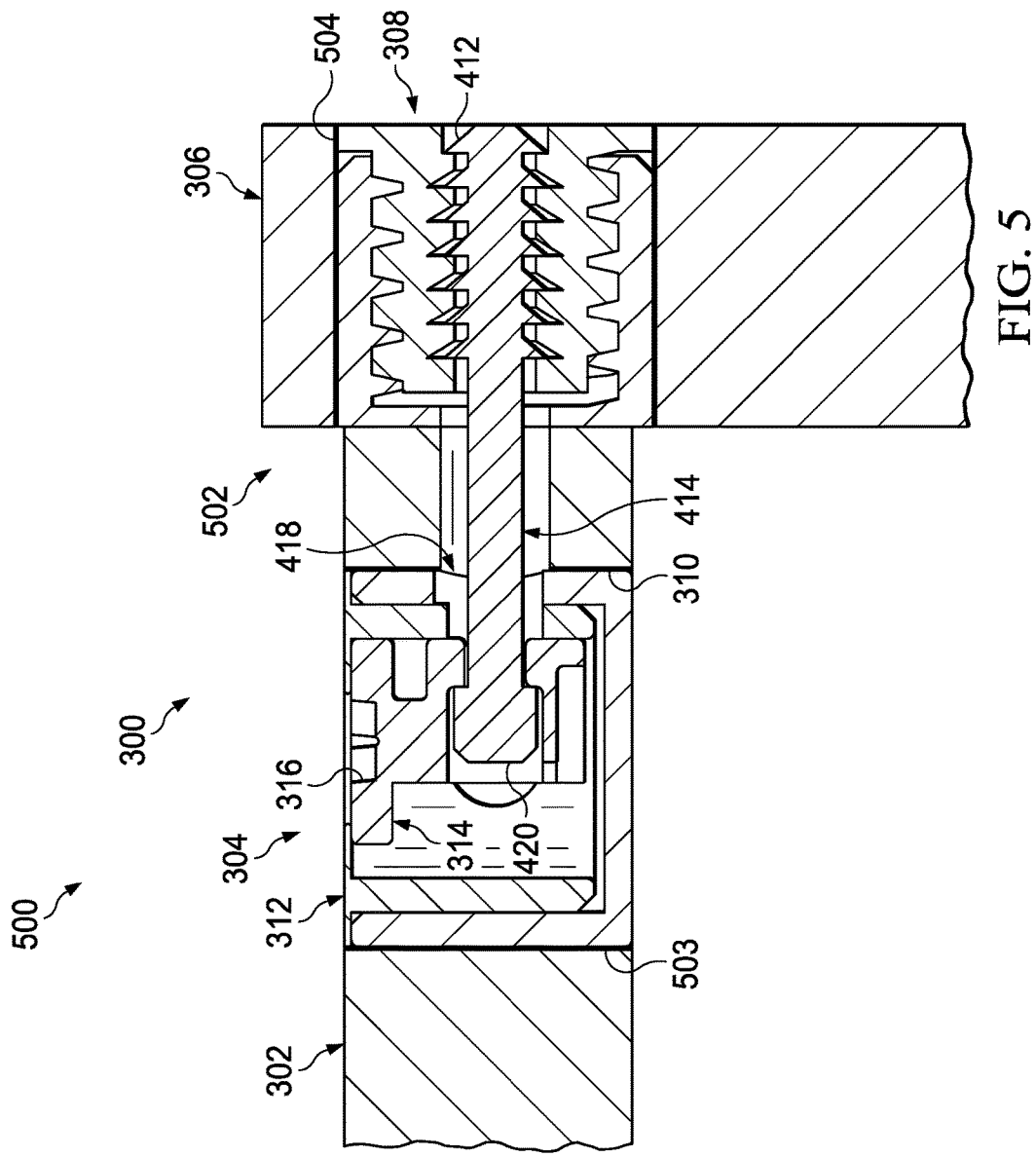
FIG. 5 is an illustration of a side cross-sectional view of a panel system in accordance with an illustrative embodiment.

Turning now to FIG. 5, an illustration of a side cross-sectional view of a panel system is depicted in accordance with an illustrative embodiment. View 500 is a side cross-ssectional view of panel system 300 of FIG. 3. Panel system 300 forms joint 502. As depicted, joint 502 is a butt joint between first composite sandwich panel 302 and second composite sandwich panel 306.

Panel system 300 may be formed in at least two separate steps. For example, cam assembly 304 and stud receiving assembly 308 may be inserted into first composite sandwich panel 302 and second composite sandwich panel 306, respectively, during a separate step other than a joining step.

For example, other inserts (not depicted) may be placed into first composite sandwich panel 302 and second composite sandwich panel 306 during an insertion step. Potting material is applied between these inserts and the respective panel of first composite sandwich panel 302 or second composite sandwich panel 306.

Cam assembly 304 and stud receiving assembly 308 may be inserted into first composite sandwich panel 302 and second composite sandwich panel 306 during this pre-existing insertion step. By inserting cam assembly 304 and stud receiving assembly 308 during a pre-existing insertion step for other inserts, potting material 503 within first hole 310 contacting cam assembly 304 and first composite sandwich panel 302 and potting material 504 within second hole 318 of FIG. 3, contacting stud receiving assembly 308 and second composite sandwich panel 306 is applied and cured when other inserts are also receiving potting material. By using a pre-existing potting material application step, at least one of manufacturing time, manufacturing cost, or waste may be reduced.

At least one of first composite sandwich panel 302 or second composite sandwich panel 306 may receive additional manufacturing processes prior to joining. First composite sandwich panel 302 and second composite sandwich panel 306 are then joined in a separate joining step from the insertion and potting step.

In the joining step, first composite sandwich panel 302 and second composite sandwich panel 306 may be joined using only one tool and no potting material. In the joining step, first end 412 of stud 414 is inserted into stud receiving assembly 308. Head 420 of stud 414 is then inserted into opening 418 of housing 312. When head 420 of stud 414 is within housing 312, cam connector 314 is rotated using cam drive 316. Rotating cam connector 314 relative to head 420 of stud 414 secures head 420 within housing 312. As depicted, rotating cam connector 314 a quarter turn secures head 420 of stud 414.

Figure 6:
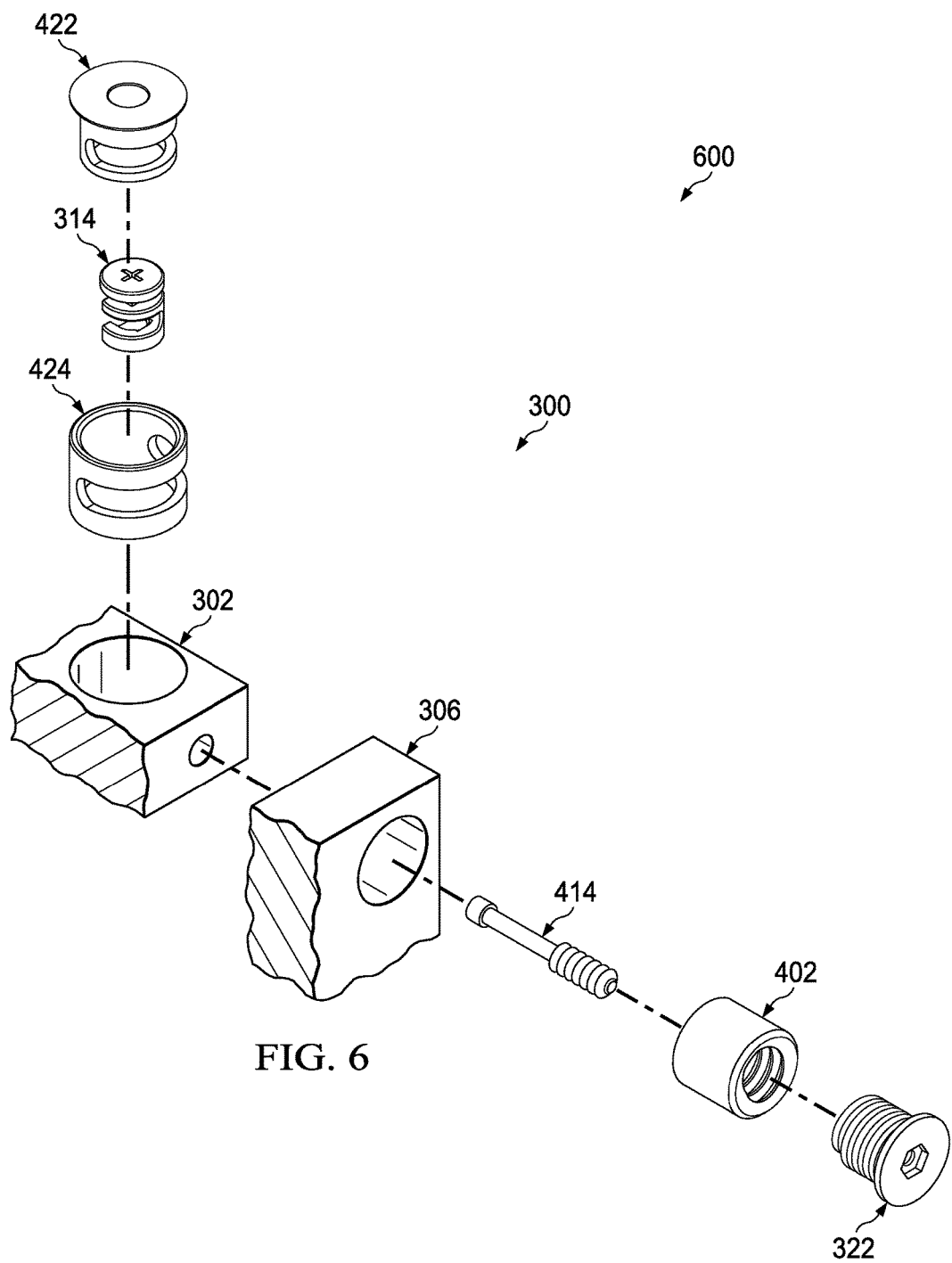
FIG. 6 is an illustration of an exploded isometric view of a panel system in accordance with an illustrative embodiment.

Turning now to FIG. 6, an illustration of an exploded isometric view of a panel system is depicted in accordance with an illustrative embodiment. View 600 is an exploded view of panel system 300 of FIG. 3.

Figure 7:
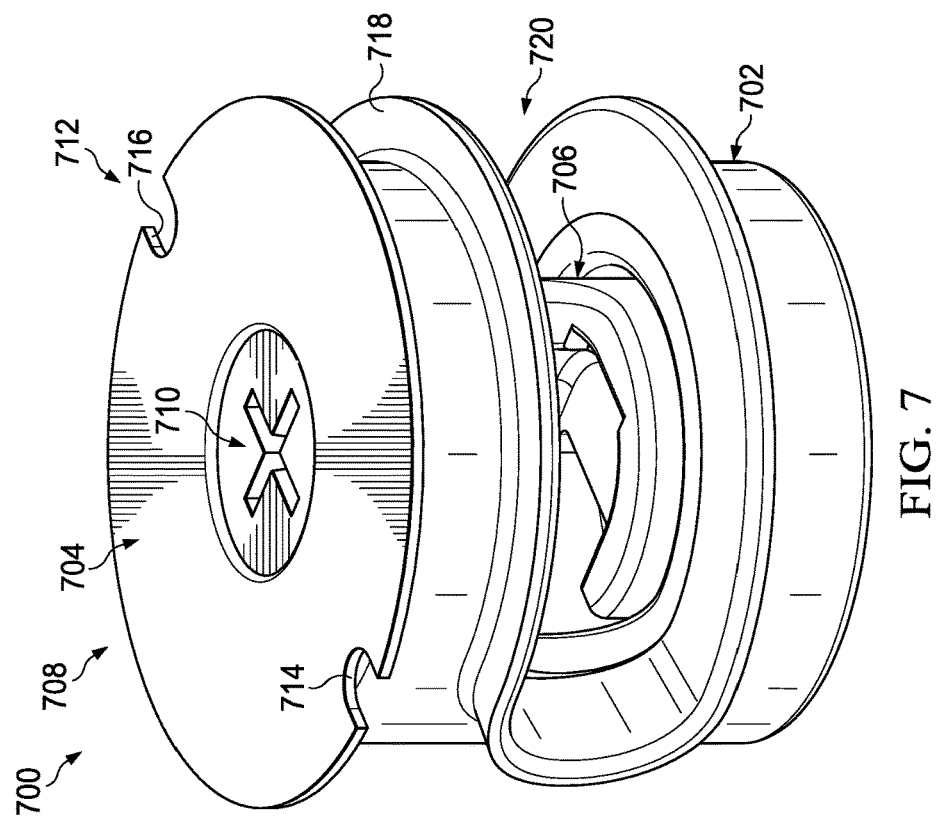
FIG. 7 is an illustration of an isometric view of a cam assembly in accordance with an illustrative embodiment.

Turning now to FIG. 7, an illustration of an isometric view of a cam assembly is depicted in accordance with an illustrative embodiment. Cam assembly 700 is a physical implementation of cam assembly 212 of FIG. 2. Cam assembly 700 may be the same as cam assembly 304 of FIG. 3.

Cam assembly 700 includes outer cam case 702, inner cam case 704, and cam connector 706. As depicted, cam connector 706 may be rotated relative to housing 708 and formed by outer cam case 702 and inner cam case 704, by engaging cam drive 710.

Potting material (not depicted) may be applied between cam assembly 700 and a composite sandwich panel such as composite sandwich panel 209 of FIG. 2 or first composite sandwich panel 302 of FIG. 3. Potting material may be applied between cam assembly 700 and a composite sandwich panel by injection. More specifically, number of notches 712 in inner cam case 704 may receive a nozzle for injection of potting material between cam assembly 700 and a composite sandwich panel. Number of notches 712 includes notch 714 and notch 716. Number of notches 712 is a physical implementation of number of notches 270 of FIG. 2.

Lip 718 is present on outer cam case 702 to discourage potting material from entering opening 720 of housing 708. Lip 718 may contact the composite sandwich panel to provide a barrier to the potting material.

Figure 8:
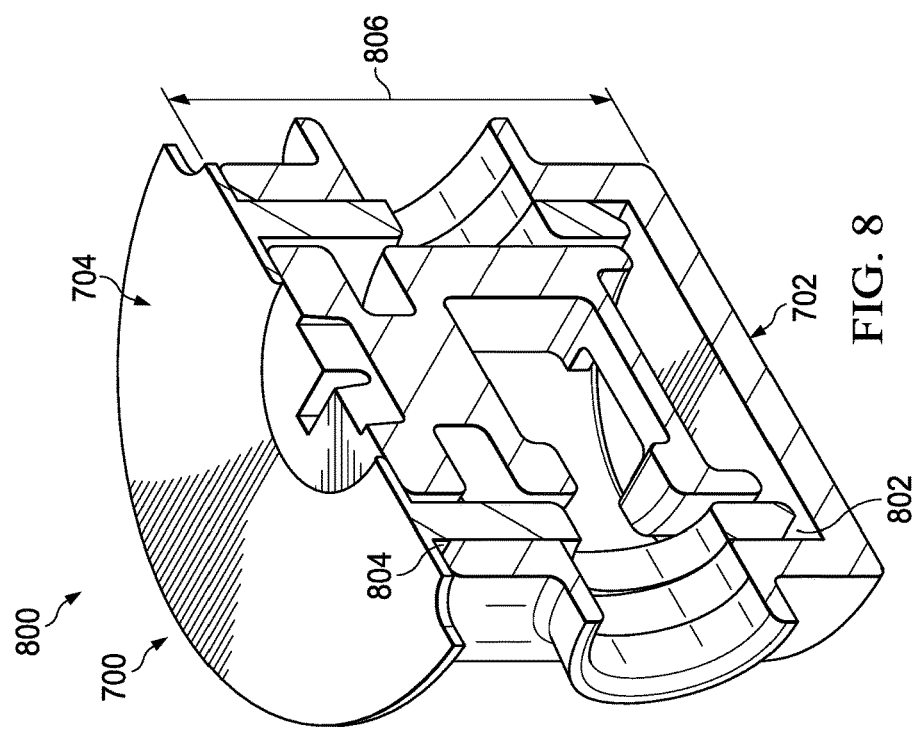
FIG. 8 is an illustration of an isometric cross-sectional view of a cam assembly in accordance with an illustrative embodiment.

Turning now to FIG. 8, an illustration of an isometric cross-sectional view of a cam assembly is depicted in accordance with an illustrative embodiment. View 800 is a cross-sectional view of cam assembly 700 of FIG. 7.

As depicted, gap 802 and gap 804 are present between outer cam case 702 and inner cam case 704. Gap 802 and gap 804 will change if thickness 806 of cam assembly 700 is changed to accommodate tolerances of a composite sandwich panel.

Figure 9:
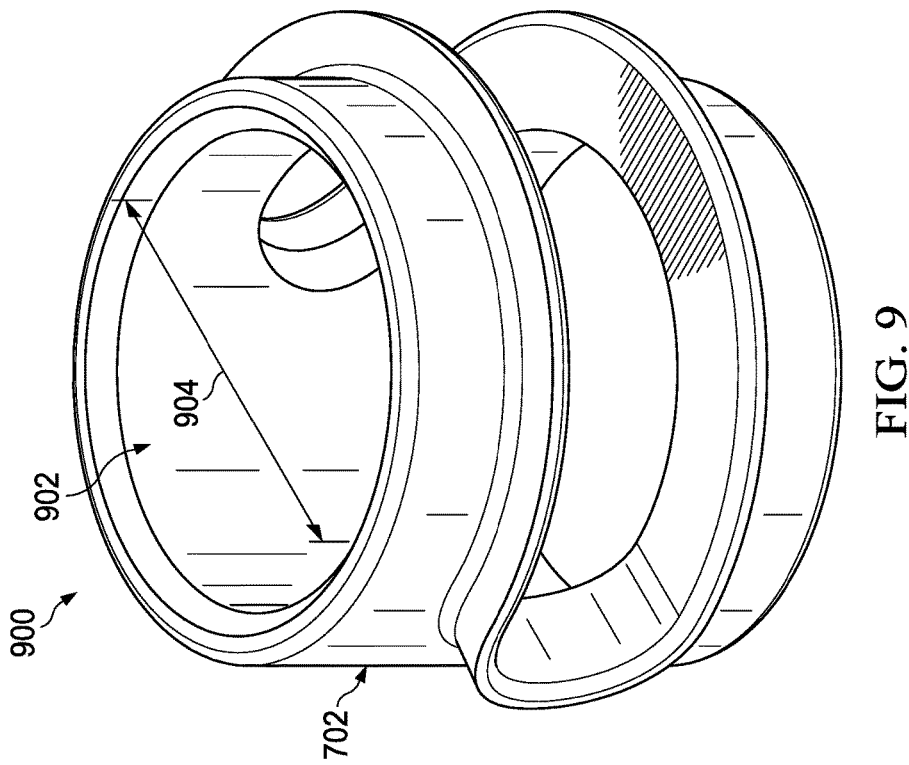
FIG. 9 is an illustration of an isometric view of an outer cam case in accordance with an illustrative embodiment.

Turning now to FIG. 9, an illustration of an isometric view of an outer cam case is depicted in accordance with an illustrative embodiment. View 900 is a view of outer cam case 702 removed from cam assembly 700 of FIG. 7. As depicted, outer cam case 702 has opening 902. Diameter 904 is configured to receive a portion of inner cam case 704. More specifically, diameter 904 of outer cam case 702 is configured to have a resistance fit with a portion of inner cam case 704.

Figure 10:
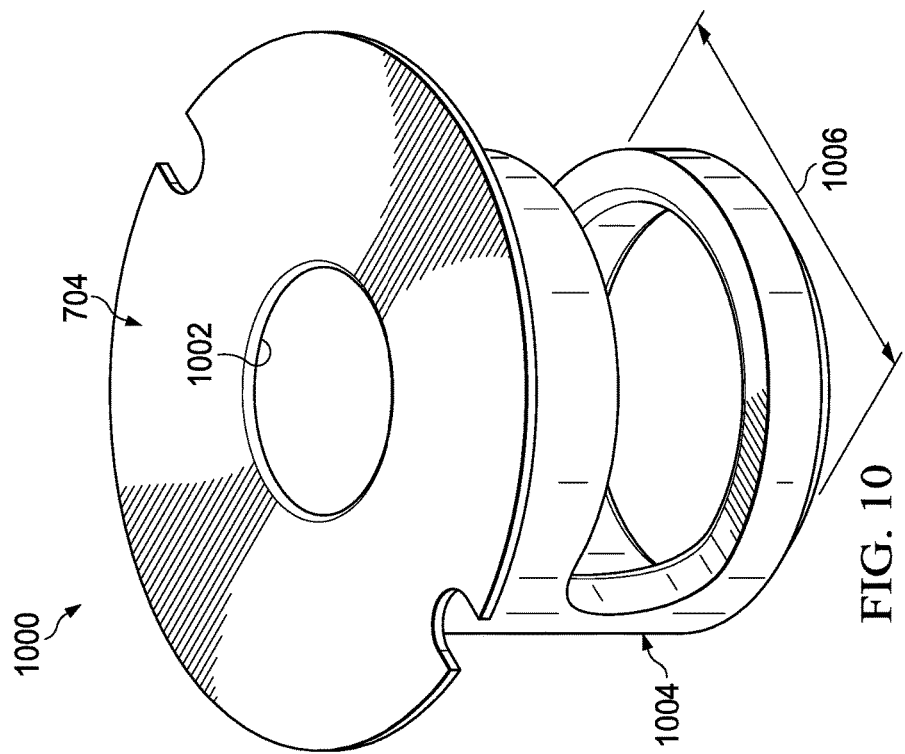
FIG. 10 is an illustration of an isometric view of an inner cam case in accordance with an illustrative embodiment.

Turning now to FIG. 10, an illustration of an isometric view of an inner cam case is depicted in accordance with an illustrative embodiment. View 1000 is a view of inner cam case 704 removed from cam assembly 700. As depicted, inner cam case 704 has hole 1002. A driver may be inserted into hole 1002 to engage cam drive 710 of FIG. 7. Body 1004 of inner cam case 704 has diameter 1006. Diameter 1006 is configured such that body 1004 can be inserted into opening 902 of outer cam case 702 of FIG. 9. Further, diameter 1006 is configured to have a resistance fit with diameter 904 of outer cam case 702 in FIG. 9.

Figure 11:
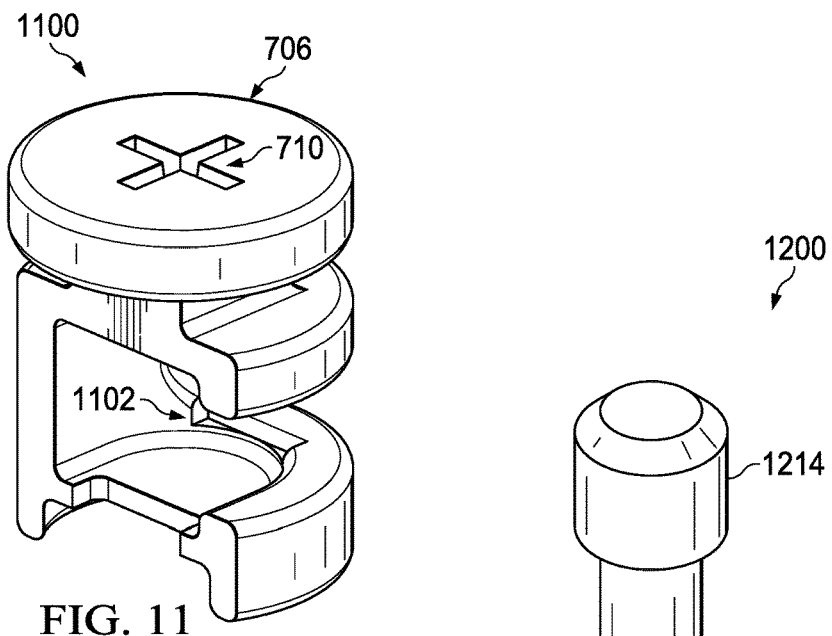
FIG. 11 is an illustration of an isometric view of a cam connector in accordance with an illustrative embodiment.

Turning now to FIG. 11, an illustration of an isometric view of a cam connector is depicted in accordance with an illustrative embodiment. View 1100 is a view of cam connector 706 removed from cam assembly 700. As depicted, cam connector 706 has locking mechanism 1102. When cam connector 706 is rotated within cam assembly 700, locking mechanism 1102 contacts a head of a stud. Locking mechanism 1102 retains the head of the stud within cam assembly 700. Locking mechanism 1102 contacts the head of the stud and provides friction to discourage rotation of cam connector 706 relative to the stud. The friction discourages removal of the stud from cam assembly 700 due to the movement of the composite sandwich panels or other inadvertent removal of the stud.

Figure 12:
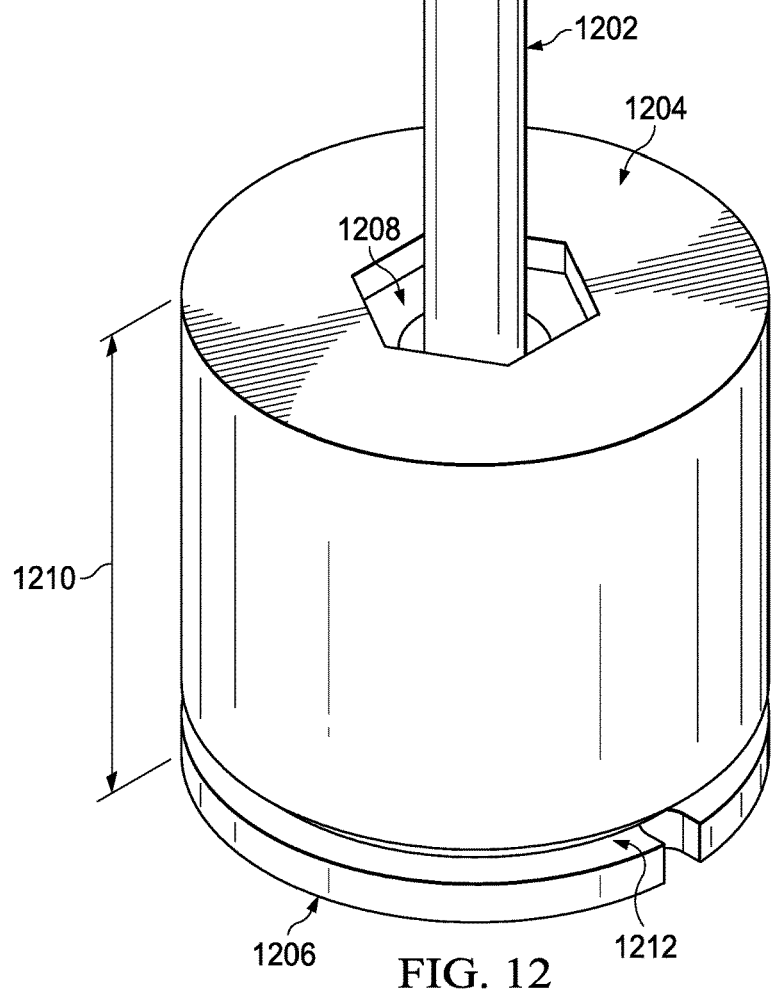
FIG. 12 is an illustration of an isometric view of a stud receiving assembly and a stud in accordance with an illustrative embodiment.

Turning now to FIG. 12, an illustration of an isometric view of a stud receiving assembly and a stud is depicted in accordance with an illustrative embodiment. Stud receiving assembly 1200 is a physical implementation of stud receiving assembly 214 of FIG. 2. In some examples, stud receiving assembly 1200 may be the same as stud receiving assembly 308 of FIG. 3. Stud 1202 is a physical implementation of stud 221 of FIG. 2. In some examples, stud 1202 may be the same as stud 414 of FIG. 4.

As depicted, stud receiving assembly 1200 includes outer stud case 1204 and inner stud case 1206. Case drive 1208 may be used to change thickness 1210 of stud receiving assembly 1200. When thickness 1210 is changed, channel 1212 between outer stud case 1204 and inner stud case 1206 increases or decreases in size. As depicted, case drive 1208 takes the form of a hex socket. To provide torque, a case drive may also be present in inner stud case 1206.

As depicted, a first end of stud 1202 extends through case drive 1208 into stud receiving assembly 1200. Head 1214 remains outside of stud receiving assembly 1200.

Figure 13:
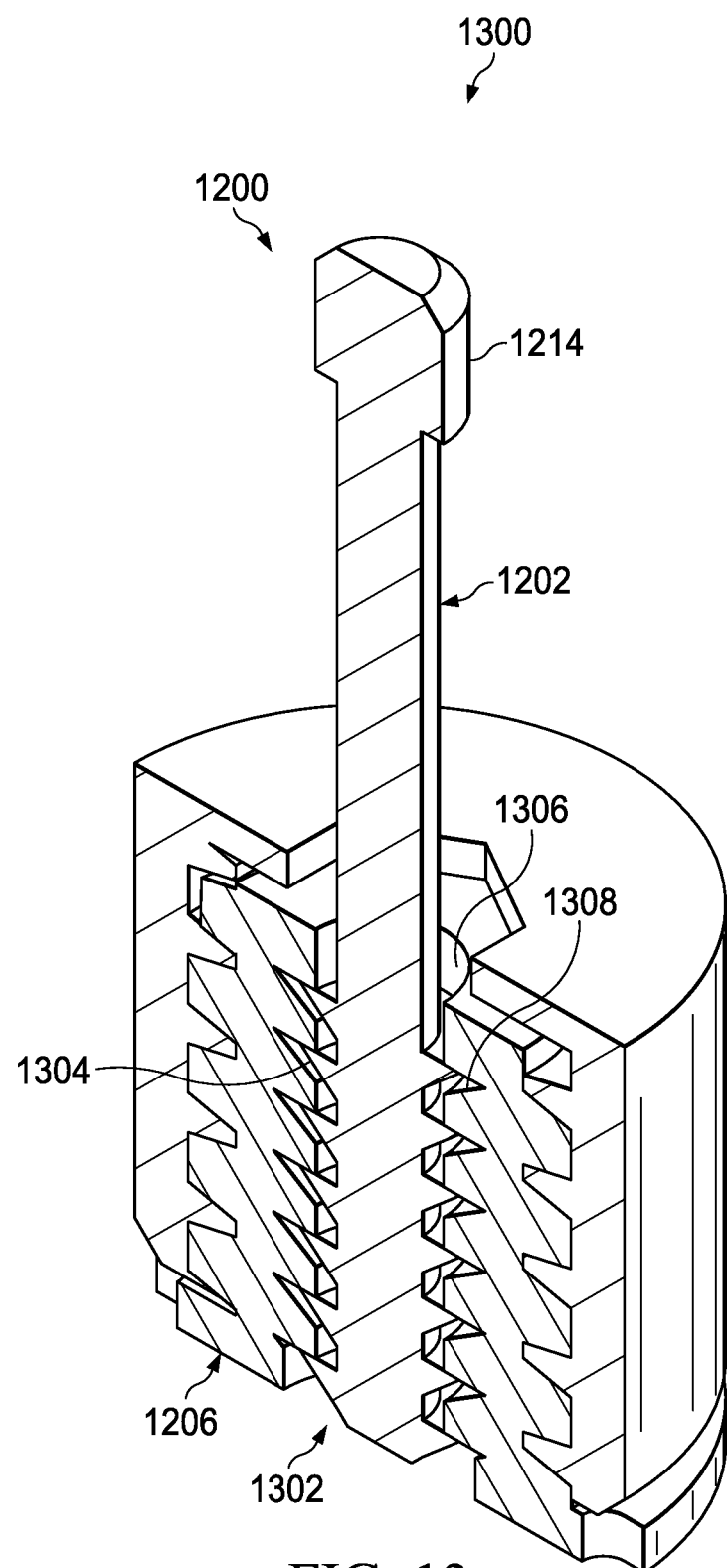
FIG. 13 is an illustration of an isometric cross-sectional view of a stud receiving assembly and a stud in accordance with an illustrative embodiment.

Turning now to FIG. 13, an illustration of an isometric cross-sectional view of a stud receiving assembly and a stud is depicted in accordance with an illustrative embodiment. View 1300 is an isometric cross-sectional view of stud receiving assembly 1200 of FIG. 12.

As depicted, first end 1302 of stud 1202 has plurality of external retaining fins 1304. In some illustrative examples, plurality of external retaining fins 1304 may be referred to as simply retaining fins, plurality of retaining fins, or external retaining fins. Plurality of external retaining fins 1304 are configured to be inserted into hole 1306 of inner stud case 1206 and be retained by internal retaining channels 1308 of inner stud case 1206. Material for stud 1202 is selected to provide a desirable elastic property for insertion without permanent deformation. Further, material for stud 1202 is selected to provide desirable strength to prevent inadvertent removal of stud 1202.

Figure 14:
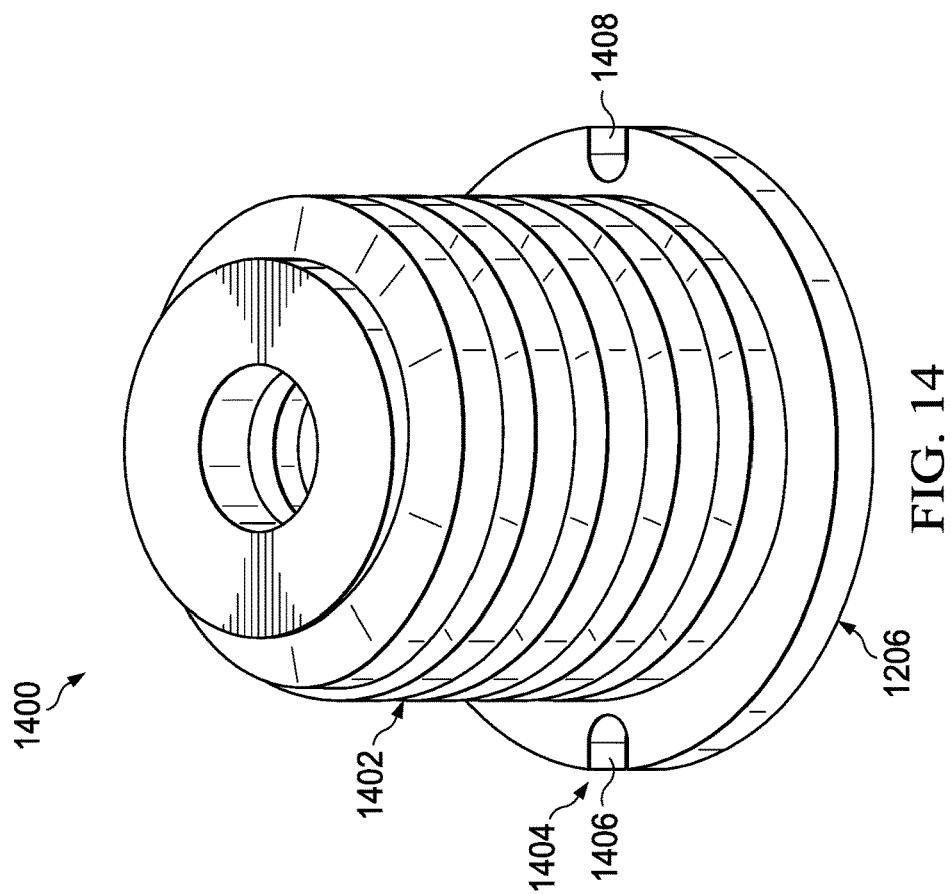
FIG. 14 is an illustration of an isometric view of an inner stud case in accordance with an illustrative embodiment.

Turning now to FIG. 14, an illustration of an isometric view of an inner stud case is depicted in accordance with an illustrative embodiment. View 1400 is a view of inner stud case 1206 removed from stud receiving assembly 1200 of FIG. 12. Inner stud case 1206 has external threads 1402 configured to engage internal threads of outer stud case 1204.

Inner stud case 1206 has number of notches 1404. Potting material (not depicted) may be applied between stud receiving assembly 1200 and a composite sandwich panel such as composite sandwich panel 210 of FIG. 2 or second composite sandwich panel 306 of FIG. 3.

Potting material may be applied between stud receiving assembly 1200 and a composite sandwich panel by injection. More specifically, number of notches 1404 in inner stud case 1206 may receive a nozzle for injection of potting material between stud receiving assembly 1200 and a composite sandwich panel. Number of notches 1404 includes notch 1406 and notch 1408. Number of notches 1404 is a physical implementation of number of notches 280 of FIG. 2. In some illustrative examples, number of notches 1404 may have a substantially similar shape to number of notches 714 of cam assembly 700 of FIG. 7. By having substantially similar shapes, the same nozzle may be used to inject potting material into number of notches 1404 and number of notches 714.

Figure 15:
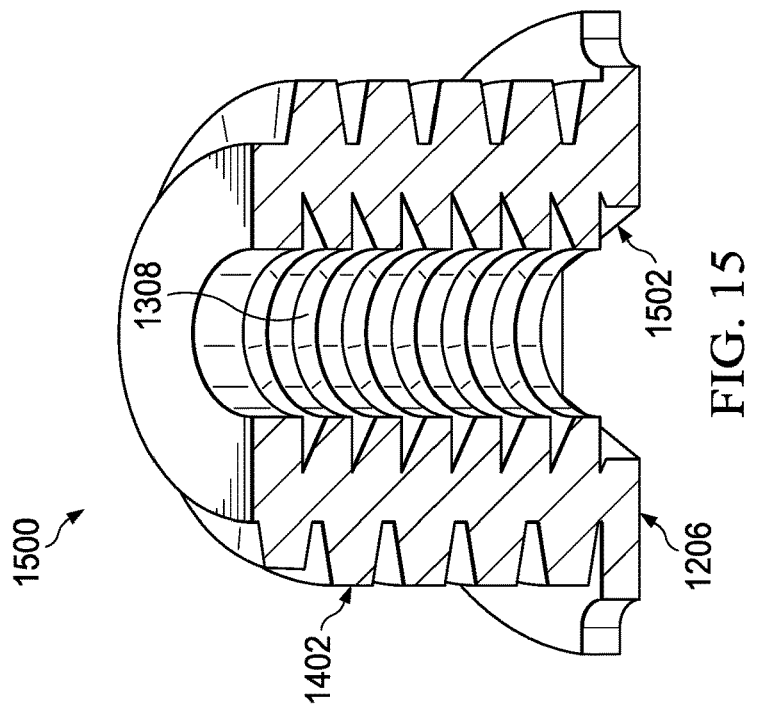
FIG. 15 is an illustration of an isometric cross-sectional view of an inner stud case in accordance with an illustrative embodiment.

Turning now to FIG. 15, an illustration of an isometric cross-sectional view of an inner stud case is depicted in accordance with an illustrative embodiment. View 1500 is a cross-section view of inner stud case 1206 of FIG. 12. In view 1500, internal retaining channels 1308 of inner stud case 1206, which are configured to retain a first end of stud 1202, are visible.

Further, in view 1500, case drive 1502 is visible. As depicted, case drive 1502 is a hexagonal socket. In other illustrative examples, case drive 1502 may take the form of any desirable drive.

Figure 16:
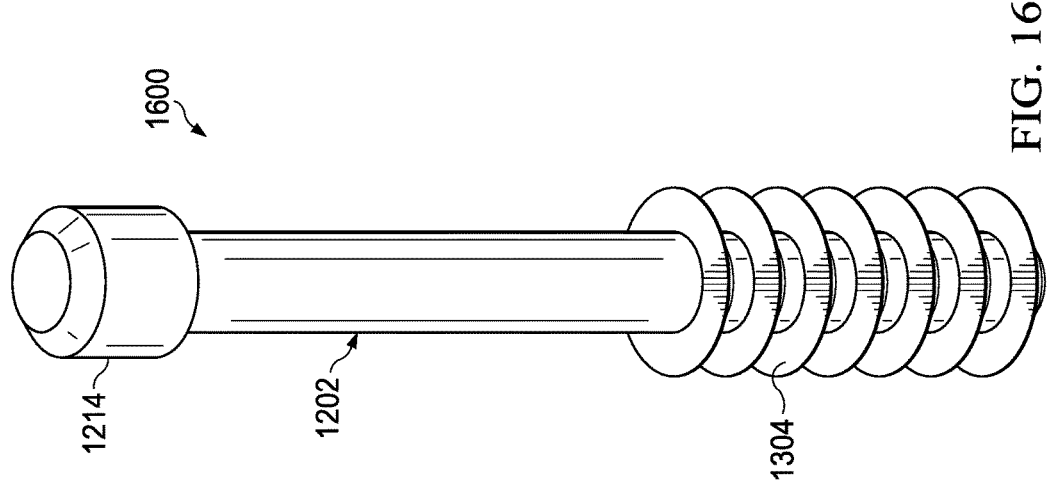
FIG. 16 is an illustration of an isometric view of a stud in accordance with an illustrative embodiment.

Turning now to FIG. 16, an illustration of an isometric view of a stud is depicted in accordance with an illustrative embodiment. View 1600 is an isometric view of stud 1202 prior to insertion into stud receiving assembly 1200 of FIG. 12. Stud 1202 may be referred to as a "Christmas tree stud." Stud 1202 has plurality of external retaining fins 1304, configured to be inserted into hole 1306 of inner stud case 1206 and to be retained by internal retaining channels 1308 of inner stud case 1206. Stud 1202 has head 1214 configured to be retained by a cam connector, such as cam connector 706 of FIG. 7.

Stud 1202 is inserted into stud receiving assembly 1200 without any tools. Stud 1202 is retained within stud receiving assembly 1200 by using a single tool to rotate cam connector 706. Thus, stud 1202, stud receiving assembly 1200, and cam connector 706 may form a joining assembly with a lower joining time than conventional joining systems.

Figure 17:
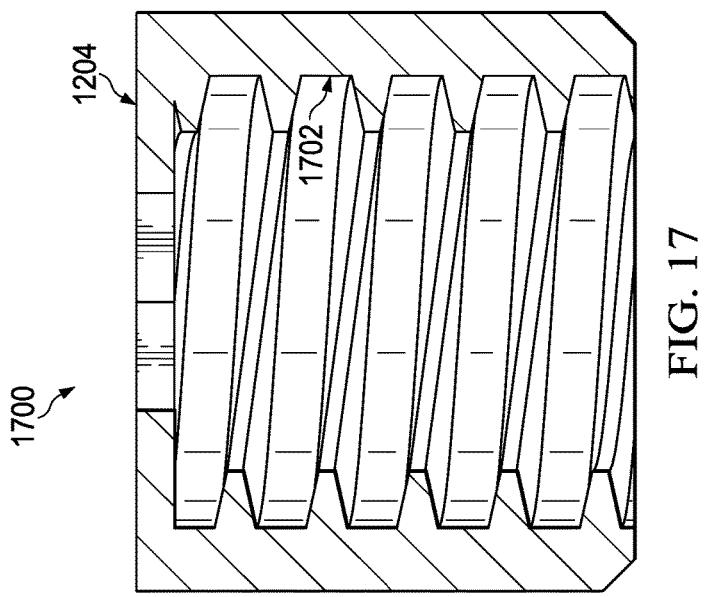
FIG. 17 is an illustration of a side cross-sectional view of an outer stud case in accordance with an illustrative embodiment.

Turning now to FIG. 17, an illustration of a side cross-sectional view of an outer stud case is depicted in accordance with an illustrative embodiment. View 1700 is a view of outer stud case 1204 removed from stud receiving assembly 1200 of FIG. 12. As depicted, outer stud case 1204 has internal threads 1702. Internal threads 1702 engage with external threads 1402 of inner stud case 1206 of FIG. 12.

Turning now to FIG. 18, an illustration of a flowchart of a method of joining two composite sandwich panels is depicted in accordance with an illustrative embodiment. Method 1800 may be used to join composite sandwich panel 209 and composite sandwich panel 210 of FIG. 2. Further, method 1800 may be used to form panel system 300 of FIGS. 3-5.

Method 1800 inserts a cam assembly into a first hole extending through a thickness of a first composite panel, the cam assembly comprises a housing and a cam connector rotatable within the housing, and the cam connector is configured to engage a head of a stud (operation 1802). In some illustrative examples, the cam assembly is inserted into the first composite panel when other inserts are inserted into the first composite panel.

Method 1800 inserts a stud receiving assembly within a second hole extending through a thickness of a second composite panel, the stud receiving assembly having retaining channels configured to secure a first end of the stud within the stud receiving assembly (operation 1804). Afterwards the process terminates. In some illustrative examples, the stud receiving assembly is inserted into the second composite panel when other inserts are inserted into the second composite panel.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order depending upon the functionality involved. Also, other blocks may be added in addition to the illustrated blocks in a flowchart or block diagram.

For example, method 1800 may further comprise rotating an inner stud case of the stud receiving case relative to an outer stud case of the stud receiving case to adjust a length of the stud receiving case. As another example, method 1800 may further comprise injecting a potting material into the first hole between the cam assembly and the first composite panel; and injecting the potting material into the second hole between the stud receiving assembly and the second composite panel. In some illustrative examples, injecting the potting material into the first hole and the second hole is performed during a potting step for other inserts for at least one of the first composite panel or the second composite panel.

In some illustrative examples, method 1800 further comprises inserting the first end of the stud into the stud receiving assembly, inserting the head of the stud into the housing of the cam assembly, and rotating the cam connector within the housing to engage the head of the stud and form a joint between the first composite sandwich panel and the second composite sandwich panel. In some of these illustrative examples, inserting the first end of the stud into the stud receiving assembly is performed during an assembly step following the potting step.

Further, in method 1800 the joint may be a butt joint. In some illustrative examples, the first composite sandwich panel and the second composite sandwich panel comprise a plurality of composite skins, and method 1800 further comprises applying loads to the joint and transferring applied shear loads to the plurality of composite skins by the stud.

Illustrative embodiments of the present disclosure may be described in the context of aircraft manufacturing and service method 1900 as shown in FIG. 19 and aircraft 2000 as shown in FIG. 20. Turning first to FIG. 19, an illustration of an aircraft manufacturing and service method is depicted in accordance with an illustrative embodiment. During pre-production, aircraft manufacturing and service method 1900 may include specification and design 1902 of aircraft 2000 in FIG. 20 and material procurement 1904.

During production, component and subassembly manufacturing 1906 and system integration 1908 of aircraft 2000 takes place. Thereafter, aircraft 2000 may go through certification and delivery 1910 in order to be placed in service 1912. While in service 1912 by a customer, aircraft 2000 is scheduled for routine maintenance and service 1914, which may include modification, reconfiguration, refurbishment, and other maintenance or service.

Each of the processes of aircraft manufacturing and service method 1900 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 20, an illustration of an aircraft is depicted in which an illustrative embodiment may be implemented. In this example, aircraft 2000 is produced by aircraft manufacturing and service method 1900 in FIG. 19 and may include airframe 2002 with a plurality of systems 2004 and interior 2006. Examples of systems 2004 include one or more of propulsion system 2008, electrical system 2010, hydraulic system 2012, and environmental system 2014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1900. One or more illustrative embodiments may be used during component and subassembly manufacturing 1906 of FIG. 19. For example, fastening system 206 of FIG. 2 may be used to join composite sandwich panels during component and subassembly manufacturing 1906. Further, fastening system 206 of FIG. 2 may be used to join composite sandwich panels for replacement parts during maintenance and service 1914 of FIG. 19.

The illustrative examples provide a panel fastening system including a pair of inserts, a cam assembly and a stud receiving assembly. The panel fastening system also includes a stud where one of the inserts uses cam action to compression lock on to the stud to couple the panels together. This allows for a potter to position all of the inserts, and then using an assembler only to screw one end of the stud to one insert then compression lock the other end of the stud to the other insert to couple the panels together.

While the potter may still take several minutes per insert, the assembler may only take a few seconds to couple the stud to the inserts. This can save time and costs associated with forming monuments from cored composite panels by moving the labor upstream in the manufacturing process. Specifically, by using a pre-existing potting step, additional potting dry time specifically for the panel fastening system may not be added to the monument. The potting material of the panel fastening system may dry while potting material for other inserts dries. Additionally, by using a pre-existing potting step, additional waste may not be created for the panel fastening system specifically. The waste for potting the panel fastening system is shared with the other inserts of the pre-existing potting step.

The design of this fastening system can have up to 30 thousandths per hole of tolerance, so the accuracy of the machining may be reduced to save time and costs. In some examples, the fastening system may be designed to be slightly stronger (tensile, in-plane shear, and out-plane shear) than the composite sandwich panels so the insert and stud do not break in the panel. Repairs and/or replacements may be easier than if the fastener broke in the panel.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A fastening system for joining a first composite sandwich panel and a second composite sandwich panel, the fastening system comprising:
   a cam assembly positioned within a first hole extending through a thickness of a first composite sandwich panel, the cam assembly comprising a housing and a cam connector rotatable within the housing, wherein the cam connector is configured to engage a head of a stud;
   a stud receiving assembly positioned within a second hole extending through a thickness of a second composite sandwich panel, the stud receiving assembly having internal retaining channels configured to secure a first end of the stud within the stud receiving assembly, wherein an inner stud case of the stud receiving assembly is configured such that rotating the inner stud case adjusts a length of the stud receiving assembly to be the same as the thickness of the second composite sandwich panel; and
   the stud, wherein the stud comprises a plurality of retaining fins configured to engage the internal retaining channels of the stud receiving assembly, and wherein the stud is configured to be inserted into the stud receiving assembly without rotation.

2. The fastening system of claim 1, wherein the housing comprises an opening configured to receive the head of the stud.

3. The fastening system of claim 2, wherein a first hole in an inner cam case and a second hole in an outer cam case form the opening of the housing.

4. The fastening system of claim 1, wherein the housing comprises an inner cam case and an outer cam case, wherein the inner cam case and the outer cam case have a friction fit.

5. The fastening system of claim 1 further comprising:
   a potting material within the first hole contacting the cam assembly and the first composite sandwich panel and within the second hole contacting the stud receiving assembly and the second composite sandwich panel.

6. The fastening system of claim 1, wherein at least one of the stud or an inner stud case of the stud receiving assembly is formed of a high performing thermoplastic.

7. A panel system for forming a monument, the panel system comprising:
- a first composite sandwich panel having a first hole extending through a thickness of the first composite sandwich panel;
- a cam assembly positioned within the first hole, the cam assembly comprising a housing and a cam connector rotatable within the housing, wherein the cam connector is configured to engage a head of a stud;
- a second composite sandwich panel having a second hole extending through a thickness of the second composite sandwich panel;
- a stud receiving assembly positioned within the second hole, the stud receiving assembly having internal retaining channels configured to secure a first end of the stud within the stud receiving assembly, wherein an inner stud case of the stud receiving assembly is configured such that rotating the inner stud case adjusts a length of the stud receiving assembly to be the same as the thickness of the second composite sandwich panel; and
- the stud having a head on a second end and a plurality of retaining fins on the first end, and wherein the stud is configured to be inserted into the stud receiving assembly without rotation.

8. The panel system of claim 7, wherein the stud is formed of a material configured to provide one-way plastic deformation.

9. The panel system of claim 7, wherein the first composite sandwich panel comprises a first skin, a honeycomb core, and a second skin, and wherein the second composite sandwich panel comprises a third skin, a honeycomb core, and a fourth skin.

10. The panel system of claim 7, wherein a core of the first composite sandwich panel is a honeycomb core, and wherein a core of the second composite sandwich panel is a honeycomb core.

11. The panel system of claim 7, wherein the housing comprises an opening configured to receive the head of the stud.

12. The panel system of claim 11, wherein a first hole in an inner cam case and a second hole in an outer cam case form the opening of the housing.

13. A method comprising:
- inserting a cam assembly into a first hole extending through a thickness of a first composite panel, the cam assembly comprising a housing and a cam connector rotatable within the housing, wherein the cam connector is configured to engage a head of a stud, and wherein the housing has a substantially smooth exterior surface;
- inserting a stud receiving assembly within a second hole extending through a thickness of a second composite panel, the stud receiving assembly having internal retaining channels configured to secure a first end of the stud within the stud receiving assembly, wherein the stud receiving assembly has a substantially smooth exterior surface;
- inserting the stud into the first end of the stud into the stud receiving assembly by pushing the stud into the first end of the stud receiving assembly, wherein the stud is configured to be inserted into the stud receiving assembly without rotation; and
- rotating an inner stud case of the stud receiving assembly relative to an outer stud case of the stud receiving assembly to adjust a length of the stud receiving assembly, such that the length of the stud receiving assembly is substantially the same as the thickness of the second composite panel.

14. The method of claim 13 further comprising:
- injecting a potting material into the first hole between the cam assembly and the first composite panel; and
- injecting the potting material into the second hole between the stud receiving assembly and the second composite panel.

15. The method of claim 14, wherein injecting the potting material into the first hole and the second hole is performed during a potting step for other inserts for at least one of the first composite panel or the second composite panel.

16. The method of claim 15 further comprising:
- inserting the head of the stud into the housing of the cam assembly; and
- rotating the cam connector within the housing to engage the head of the stud and form a joint between the first composite panel and the second composite panel.

17. The method of claim 16, wherein the joint is a butt joint.

18. The method of claim 16, wherein the first composite panel and the second composite panel comprise a plurality of composite skins, the method further comprising:
- applying loads to the joint; and
- transferring applied shear loads to the plurality of composite skins by the stud.

19. The method of claim 16, wherein inserting the first end of the stud into the stud receiving assembly is performed during an assembly step following the potting step.

20. The method of claim 13, wherein the first composite panel is a first composite sandwich panel having a honeycomb core, and wherein the second composite panel is a second composite sandwich panel having a honeycomb core.

* * * * *